United States Patent [19]

Bly

[11] Patent Number: 4,959,546
[45] Date of Patent: Sep. 25, 1990

[54] THERMO-OPTICAL FAR INFRARED SYSTEM

[75] Inventor: Vincent T. Bly, Alexandria, Va.

[73] Assignee: The United States of America as represented by the Secretary of the Army, Washington

[21] Appl. No.: 282,615

[22] Filed: Jun. 5, 1981

[51] Int. Cl.⁵ .......................... G02F 1/01; H01L 31/00
[52] U.S. Cl. .................................... 250/330; 250/338.1
[58] Field of Search ............... 250/330, 331, 334, 338, 250/338.1

[56] References Cited

U.S. PATENT DOCUMENTS 4,002,902  1/1977  Donjon et al. ................... 250/213 R
4,275,302  6/1981  Imbert et al. ........................ 250/330

Primary Examiner—Stephen C. Buczinski
Attorney, Agent, or Firm—Milton W. Lee; Aubrey J. Dunn; Anthony T. Lane

[57] ABSTRACT

An infrared detecting system with a unique detector. The detector consists of an infrared-radiation absorbing layer on one side of thin-film substrate. On the other side of the substrate is a light reflecting layer, with a transducing material on the reflecting layer having a temperature-dependent index of refraction. Infrared radiation falling on the absorbing layer causes a temperature rise in this layer, a consequent rise in temperature of the reflecting layer and the transducing material, and a resulting change in refractive index of the material and a corresponding change in reflectance of the transducing material-reflecting layer combination. A read laser beam directed onto the material is thus reflected in accordance with the infrared radiation on the detector. Alternately, the reflecting layer may be on the same side of the substrate as the absorbing layer. Also, an additional reflector may be used between the reflecting layer and the transducing material.

1 Claim, 2 Drawing Sheets

THERMO-OPTICAL FAR INFRARED SYSTEM

The invention described herein may be manufactured, used, and licensed by the U.S. Government for governmental purposes without the payment of any royalties thereon.

BACKGROUND OF THE INVENTION

The present invention is in the field of uncooled infrared detectors. Such detectors are of two general types: thermal and quantum. In a thermal detector, absorbed photons cause a rise in detector temperature and some temperature-dependent property of the detector is monitored to determine its change with temperature. Typical of such detectors are pyroelectric vidicons, detectors using expanding gases, liquids, or solids, thermocouples, bolometers, bimetallic strips, etc. A quantum detector, on the other hand, does not require a temperature rise (although one may occur) in order to have a change in some detector characteristic. Typical quantum detectors are photoelectric detectors operating on such effects as photovoltaic, photoconductive, etc. Another type of detector exists which may be considered a thermal detector, specifically, my U.S. Pat. No. 4,160,907 of July 10, 1979. This patent shows a system in which a thermo-optical transducer has a temperature-dependent optical transmissivity. A read beam passes through the transducer onto an optical detector array. All of the above detectors suffer from one or more disadvantages, such as slow response time, low signal-to-noise ratio, etc. The instant invention overcomes the various other detectors discussed above, has a high D*, fast response time, and high signal-to-noise ratio.

SUMMARY OF THE INVENTION

The inventions encompass both an infrared detecting system employing at least one unique thermo-optical detector, as well as the detector. The detector includes at least an infrared absorbing layer, a reflector in thermal contact with the absorbing layer and opposite the infrared image side thereof, and a transducing material in thermal contact with the reflector and having a temperature-dependent index of refraction. Infrared radiation impinging on the absorbing layer produces a rise in temperature thereof, and a corresponding rise in temperature of the transducing material with a consequent change in refractive index. This change in refractive index causes a change in optical reflectivity of the transducing material-reflector combination. The system further includes a brightness-regulated visible or near infrared illuminator which shines a read beam on said transducing material-reflector combination. The changes in intensity of the reflected read beam are monitored optically to provide an output signal proportional to the incident infrared radiation.

DESCRIPTION OF THE PREFERRED EMBODIMENTS OF THE INVENTION

Figure 1:
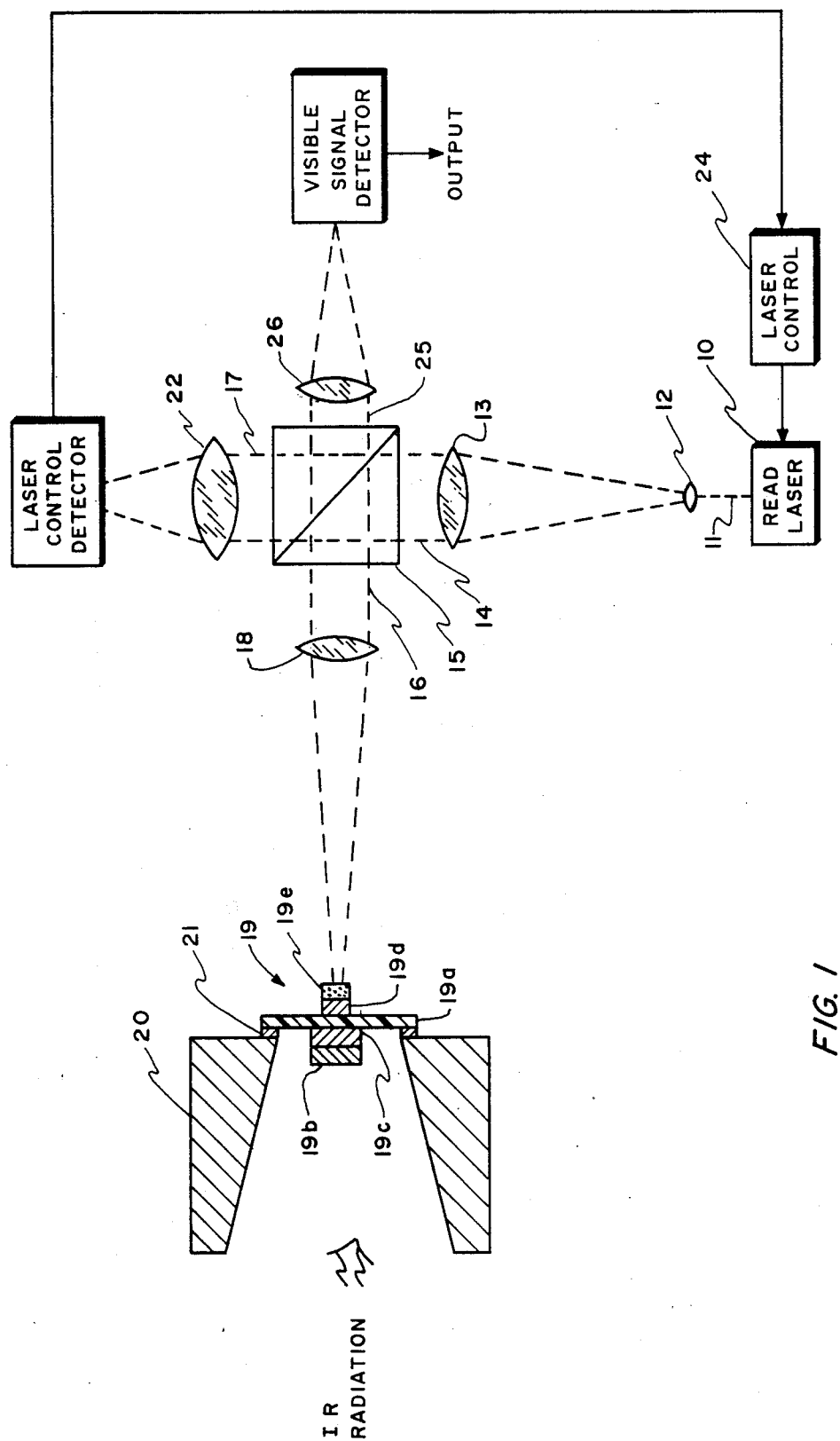
FIG. 1 is a schematic showing of the inventive system using one embodiment of the inventive detector.

The inventions might be best understood when this description is taken in conjunction with the drawings. The drawings are not to scale. The cone-detector is greatly magnified with respect to the remainder of the optical system of the invention. The system of FIG. 1 includes read laser 10, with its beam 11 focussed by lenses 12 and 13 into broad beam 14. Beam splitter 15 splits 14 into beams 16 and 17. Lens 18 focusses beam 16 into beam 16a directed onto detector 19. This detector includes thin-film substrate 19a with thermal absorber 19b and reflector 19c on the side of 19a toward the incoming infrared radiation. On the other side of 19a are reflector 19d and thermal-optical layer 19e. Substrate 19a is supported on infrared-reflective cone 20 by ring 21. Infrared radiation is reflected onto layer 19b of detector 19; this layer is a good infrared absorber such as gold black. Absorbed radiation causes 19b to rise in temperature. Reflector 19c is a metal such as aluminum or silver and performs several functions: it conducts the heat from 19b toward thermo-optical layer 19e, it acts as a reflector for infrared radiation to enhance the absorption of the radiation by 19b, it acts as an infrared shield for 19b for infrared radiation in the hemisphere of space on the opposite side of substrate 19a from 19b, and it acts as a reflector for radiation in read beam 16a. The heat absorbed by infrared radiation in 19b and conducted by 19c easily passes through substrate 19a to layers 19d and 19e, since 19a is only on the order of 100 Å thick and is a material such as cellulose nitrate, Parylene, or $\alpha Al_2O_3$. This heat is conducted by layer 19d (of a metal such as silver or aluminum) to layer 19e and causes a temperature rise therein. Layer 19e is a material whose index of refraction is related to temperature, such as cadmium sulfide or cadmium selenide.

OPERATION OF FIG. 1 SYSTEM

As discussed above, infrared radiation directed onto detector 19 causes a temperature rise in absorber 19b, a consequent temperature rise in thermo-optical layer 19e, and a consequent change in the refractive index of 19e. The thickness of 19e (on the order of 4800 Å) is such that it acts as a temperature-variable interference filter for read beam 16a. Thus, the intensity of the reflected beam is modulated by the thermally-inducted change in refractive index of the transducer material as enhanced by internal interference effects. The reflected beam passes back through lens 18 to beam splitter 15. A portion of this beam is reflected back towards laser 10 and the rest passes on as beam 25 to lens 26, which lens focusses the beam onto detector 27. This detector need be only a photodetector sensitive to radiation from laser 10. The output of detector 27 is thus indicative of the infrared radiation falling onto detector 19.

In order for the output of 27 to truly be indicative of incoming infrared radiation, it is necessary that the brightness of laser 10 be maintained accurately, since normal fluctuations in laser brightness may be much greater than the amount of brightness variation in reflected beam 16a from detector 19. The brightness of laser 10 is thus maintained as follows. Beam 17 directed onto detector 23 will cause variations in the output of 23. This output may be used in a negative-feedback mode to control laser 10. In the case of a laser diode, the current to the diode will be controlled to maintain constant brightness. The preferred embodiment of the invention employs an argon gaseous laser operating with a wavelength of 5145 Å. This laser could be controlled by an external electro-optic modulator, such as a Pockell's Cell.

Although some of the dimensions of the various layers of detector 19 have been mentioned above, typical dimensions of all the layers are listed in the table below.

| | | | |
|---|---|---|---|
| Substrate 19a | diameter ≧ 1.0 mm, | thickness = 100Å–150Å | |
| layer 19b | diameter = 0.5 mm, | thickness ≃ 40 μgm/cm$^2$ | |
| layer 19c | diameter = 0.5 mm, | thickness ≃ 100Å | |
| layer 19d | diameter = 0.15 mm, | thickness ≃ 600Å | |
| layer 10e | diameter = 0.15 mm, | thickness = 4830Å | |

Figure 2C:
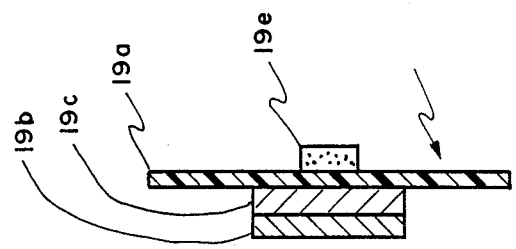
FIGS. 2a-2c are cross-sectional views of other embodiments of the inventive detector.
Figure 2B:
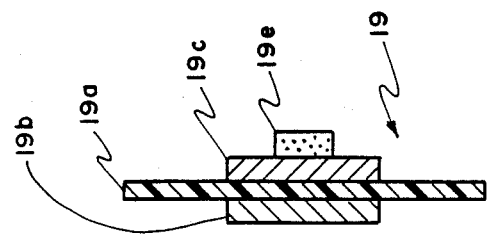
Figure 2A:
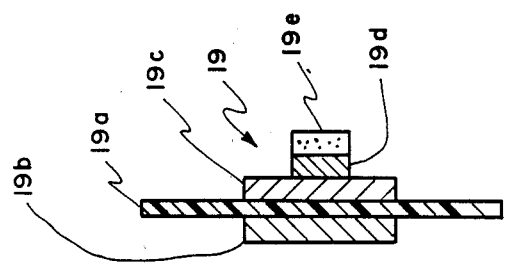

Turning now to FIGS. 2a–2c, we see various other embodiments of detector 19. In FIG. 2a, for example, the same layers are used for detector 19 as in FIG. 1, but layer 19c is on the opposite side of 19a from the arrangement of FIG. 1. FIGS. 2b and 2c show embodiments wherein layer 19d is omitted. In FIG. 2b, layer 19c is on the same side of layer 19a as in FIG. 2a; in FIG. 2c, 19e is on the same side of 19a as in FIG. 1. The thickness of layer 19a is such that layers 19b and 19c are essentially in thermal contact (FIGS. 2a and 2b). Metal layer 19d essentially puts layers 19e and 19c in thermal contact (FIGS. 1 and 2c).

It should be understood that various elements of the inventive system are enclosed in a vacuum housing which include elements shown as detector 19, cone and ring 21.

I claim:

1. A thermo-optical far infrared system including:
   a thermo-optical detector;
   means for directing infrared radiation onto one side of said detector;
   means for directing a read laser beam onto the other side of said detector; and
   means for detecting the laser beam reflected from said detector, wherein said detector includes:
   an infrared absorbing layer;
   a reflective layer with one side essentially in thermal contact with said absorbing layer; and
   a layer of material essentially in thermal contact with said reflective layer and having a temperature-dependent index of refraction, and whereby the infrared radiation on the detector induces a temperature rise and a consequent change in index of refraction therein, and thereby said read beam is reflected in accordance with said index of refraction.

* * * * *